March 10, 1959 L. LE BLAN 2,877,290

TRANSMISSION SYSTEM FOR TELEVISION SIGNALS

Filed Nov. 5, 1954 3 Sheets-Sheet 1

INVENTOR
LOUIS LE BLAN
BY Fred M. Vogel
AGENT

March 10, 1959 L. LE BLAN 2,877,290

TRANSMISSION SYSTEM FOR TELEVISION SIGNALS

Filed Nov. 5, 1954 3 Sheets-Sheet 2

INVENTOR
LOUIS LE BLAN
BY Fred De Vogel
AGENT

TRANSMISSION SYSTEM FOR TELEVISION SIGNALS

Filed Nov. 5, 1954 3 Sheets-Sheet 3

INVENTOR
LOUIS LE BLAN
BY Fred M Vogel
AGENT

United States Patent Office 2,877,290

Patented Mar. 10, 1959

2,877,290

TRANSMISSION SYSTEM FOR TELEVISION SIGNALS

Louis Le Blan, Paris, France, assignor, by mesne assignments, to North American Philips Company, Inc., New York, N. Y., a corporation of Delaware Application November 5, 1954, Serial No. 467,079

Claims priority, application France January 6, 1954

5 Claims. (Cl. 178—5.2)

The invention relates to a television transmission system of known kind, wherein simultaneously two electric signals are transmitted, of which one signal modulates the amplitudes of the positive half-cycle periods and the other signal modulates the amplitude of the negative half-cycle periods of an auxiliary carrier wave, having unequal or substantially unequal periods and being thus modulated unsymmetrically and exhibiting, in general, no mean zero value in a given time interval.

In order to enable radio transmission a second symmetrical modulation must thus be carried out on a second high-frequency wave, having a higher frequency than the first wave and serving as a final carrier, permitting direct emission through the transmitter aerial.

It is known that in such a transmission system no pure signals can, in some cases, be obtained at the receiver end; the incoming signals are disturbed by crosstalk, if no particular measures are taken both at the transmitter end and at the receiver end or if no correction is performed previously, preferably at the transmitter end.

This system for the transmission and the reception of two simultaneous signals is particularly of importance for television, since it permits transmitting and receiving simultaneously for example two different, relatively dependent or independent black-and-white (monochromatic) images or two different or non-different, monochromatic components of colour images or relief images.

However, if it is desired to transmit simultaneously two independent television signals, particular measures must be taken, since the signals for producing images never reverse their polarity (and even never become zero), in contradistinction for example to the signals for producing sound, and also since to the image signals auxiliary signals must be added or introduced into them, for example blanking signals, line and image synchronizing signals.

In the system according to the invention, there is provided a modulation level corresponding to the black level which is the same for each of the two programs.

Further features of the invention will be evident from the following description given with reference to the accompanying drawing, in which Fig. 1 shows the waveform of the signals in the known transmission system with positive modulation, Fig. 2 shows the corresponding waveform of the signals in accordance with the invention, and Fig. 3 shows a series of pulses for suppressing the main carrier during the synchronizing pulses.

Figure 1:
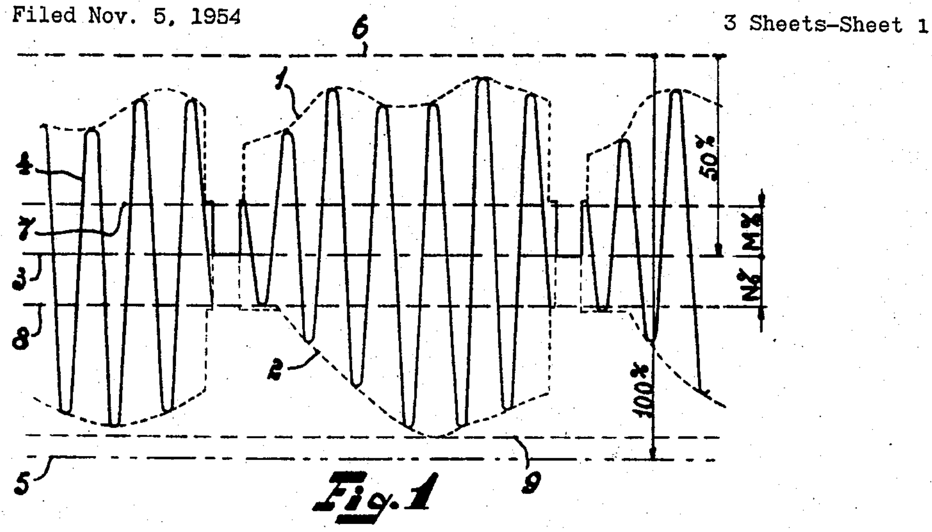

Referring to Fig. 1, which shows the known system, the main carrier is modulated at the transmitter end in a manner such that the axis of the auxiliary carrier corresponds to a modulation percentage of 50 or approximately 50. The initial signals to be transmitted, which correspond to the so-called "external" program lie completely in the range of 0 to 50% of the modulation of the main carrier, whereas the initial signals to be transmitted corresponding to the "internal" program (which may be dependent upon the former program or may be independent thereof) lie in the range of 50 to 100 of the modulation percentage of the said main carrier. For the transmission of the "external" program in the complex video signal, which modulates the main carrier from 0 to 50, the image signals proper lie for example in the range from 0 to $50-M$, whereas the blanking signals, the synchronizing signals and other signals lie in the range from $(50-M)\%$ to 50% of this modulation (i. e. $0<M<50$). Also for the transmission of the "internal" program in the complex video signal modulating the main carrier from 50 to 100%, the image signals lie for example in the range from $(50+N)\%$ to 100%, whereas the auxiliary signals lie in the range from 50% to $(50+N)\%$ (i. e. $0<N<50$). In practice N may for example be equal to M, for example to 15 to 25%.

In Fig. 1 the curve 1 indicates the complex video signal of the "external" program, whilst the curve 2 indicates the complex video signal of the "internal" program. The horizontal straight line 3 determines the position of the axis of the auxiliary carrier 4 relative to the axis 5 of the main carrier. The maximum amplitude of the non-modulated main carrier lies on the horizontal straight line 6, which determines also the level corresponding to the maximum white level of the "external" program, whereas the horizontal straight line 7 determines the black level. From this figure it is evident that the "internal" program the black level corresponds to the ordinate of the horizontal straight line 8, whereas the white level corresponds to the ordinate of a horizontal straight line 9, which is parallel to the axis 5 and is near thereto.

It is evident that by such a modulation a black-and-white receiver of the conventional type can receive the "external" program without any modification. To this end it suffices for example to control the polarisation of the electronic image reproducing tube in a manner such that the black level corresponding to the straight line 7 of Fig. 1 lies behind the cut-off limit of this tube, but near this limit. The largest part of, if not all present receivers have a manual control to perform the aforesaid control.

Figure 2:
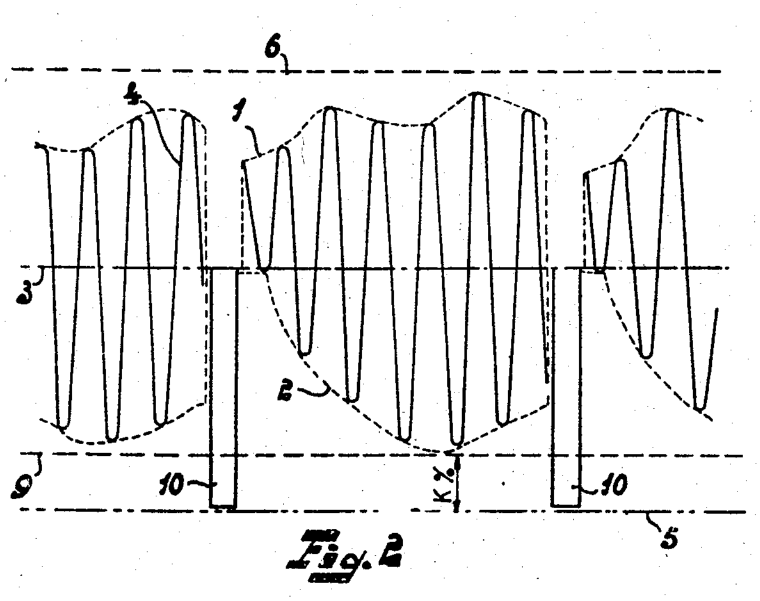

In accordance with the main feature of the invention the modulation at the transmitter end is carried out in a manner such that the black level of the "external" program coincides substantially with the axis of the auxiliary carrier, but lies slightly over this axis, whereas the black level of the "internal" program substantially coincides with this axis but lies slightly below it. Fig. 2 shows the signal composed in accordance with the invention, the corresponding elements being designated by the same reference numerals as in Fig. 1. The present receivers may be used also under the aforesaid conditions.

Such a signal is, moreover, quite suitable for the transmission of a colour program, if for the two programs to be transmitted the two main colours of the image to be transmitted are chosen. If for example the external program corresponds to the green component of the colour television program, this component is received in the conventional receiver as the "external" program of the black-and-white transmission, so that the reproducing tube reproduces black-and-white images corresponding to this component. Thus the complete "compatibility" is ensured. In order to acquire this compatibility the receiver concerned must be capable of separating and utilizing the blanking signals and the synchronizing signals. In accordance with one aspect of the invention the main carrier is to this end interrupted at the transmitter end during the line and/or frame synchronizing signals, so that these signals occur in completely the same manner as in the present transmissions. This may be obtained in a simple manner by superimposing on the auxiliary carrier 4, a series of negative pulses 10 prior to or subsequent to the modulation of the main carrier (Fig. 3), the repetition frequency of these pulses, their width and their phase being equal to those of the synchronizing pulses, the amplitude of these pulses being, however, equal to the ordinate of the straight line 3 relative to the straight line 5, taken as the origin of the ordinates. The production of the pulses 10 and their addition to the signals shown in Fig. 2 are known per se, so that there is no need for further explanation.

A signal shown in Fig. 2 has, moreover, the advantage that the complex of image signals has a total modulation percentage of the main carrier at its disposal, which percentage may exceed or be equal to $(100-K)$ for the two programs or for the two colour components. This is particularly of advantage for the transmission of colour programs. Since on the one hand a single system of auxiliary signals (blanking signals, line and frame synchronizing signals) suffices for the two initial signals corresponding to the two colour components and on the other hand the green component has a predominating brightness in the colour image (about 60%, whereas the brightness of the red component is not more than 30%), the "external" modulation being used only for the green component, an important improvement in compatibility of the black-and-white receivers is obtained, since this compatibility is ensured by the component, the modulation percentage of which is nearest that corresponding to the transmissions to which these receivers are adapted. The transmission of a colour program may for example be carried out by fixing the black level of the two components (green in the "external" program and red in the "internal" program) at about 50% of the maximum amplitude of the main carrier. The range between 50% and 100% of this amplitude is (0–50)% of the modulation percentage and is intended for the green component of the image signals and the range between for example 20 and 50% (is 50 to 80 of the modulation percentage) is intended for the red component and the range between 0% and 20% (is 80 to 100 of the modulation percentage) is intended for the synchronizing signals. As an alternative the external program may be a signal having a brightness which may be obtained, as is known, by a linear combination of a green component and a red component.

Figure 4:
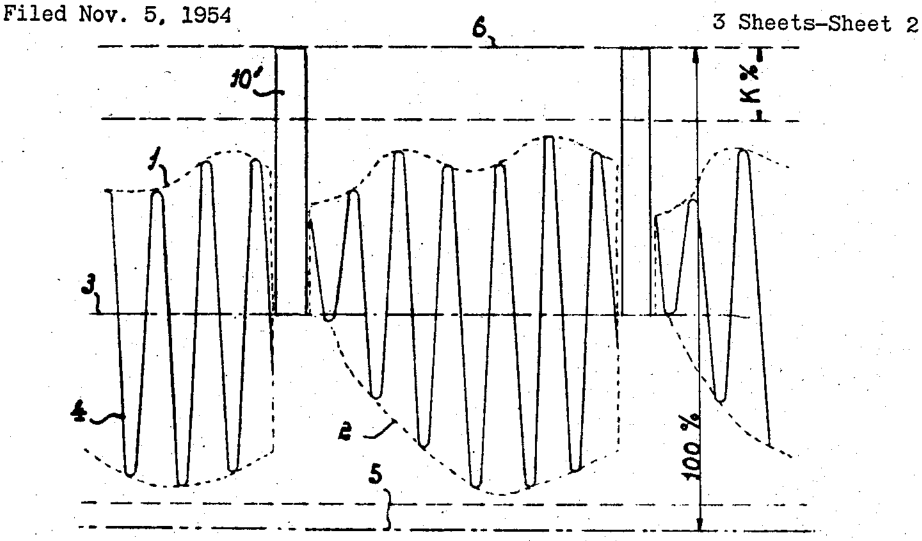
Fig. 4 shows the waveform of the signals illustrated in Fig. 2 with negative modulation.

In the foregoing it is assumed that the image modulation is a positive modulation, but the invention is not restricted thereto. In the case of negative modulation, the image signals proper are found to be unchanged (owing to the dissymmetry of the modulation of the auxiliary carrier, which is modulated twice with opposite polarities), but on the one hand they lie between 0 and $(100-K)$% of the maximum amplitude of the said main carrier, on the other hand the synchronizing pulses attain their maximum amplitude, since with this modulation the carrier is transmitted unmodulated during the synchronizing pulses. The complex of the signals is then as is shown in Fig. 4. Since the synchronizing pulses 10' have a polarity opposite that of the pulses 10 of Fig. 2 and twice the amplitude thereof, it is evident that in this case the invention may be applied, since with the "internal" modulation the same method may be applied as with the "external" modulation of the former case. Use may even be made of the fact that during the synchronizing pulses the main carrier is substantially not modulated, to carry out the separation of the synchronizing pulses in a high-frequency stage or an intermediate-frequency stage by known methods prior to the first detection of the said main carrier. It is evident that the compatibility of the existing receivers is maintained, when the order of the programs or of the colour components is reversed. Such a receiver will reproduce the images corresponding to the "internal" program of the black-and-white transmission or corresponding to the "internal" program (preferably the green component), the transposition of the two colour components being supposed to be carried out at the transmitter end.

Referring to Fig. 2, it should be noted that the synchronizing pulses 10, since they substantially suppress the main carrier, drop below the modulation percentage of the maximum white level of the "internal" program, so that an additional suppression for the image reproducing tube is required during the said pulses. This is obtained advantageously by differentiation of the pulses, i. e. the suppression is obtained by means of the front flank of the said pulses; this differentiation may be carried out by known means.

As stated above and as is evident from Fig. 2, the synchronizing pulses 10 lie at a level between the axits of the main carrier (modulation percentage 100 of this carrier) and the maximum white level (modulation $(100-K)$% (for example 75 to 80%) either of the "internal" program or of the "internal" colour component. In order that these pulses in the white level do not affect the images, it is necessary that the image reproducing tube should be cut off an instant before the occurrence of the front flank and maintained an instant after the passage of the rear flank of each synchronizing pulse. To this end the invention provides various means, i. e.

(*a*) A cut-off by known means of one or of the two reproducing tubes during the fly-back of the time base, both with the line and the frame synchronisation; this may for example be obtained by mixing the blanking signals produced by the fly-back of the line synchronisation with those produced by the fly-back of the frame synchronisation;

(*b*) The production by known means of a blanking signal produced by the front flank of each line synchronizing pulse and of a similar signal produced by the front flank of each frame synchronizing pulse, the signals thus produced being added to one another; this production is facilitated materially if, as stated above, the device for separating or using the synchronizing pulses comprises a differentiation device.

In the two aforesaid cases the synchronizing pulses are transmitted in the video circuit through a delay line (one delay line for each synchronisation), so that these pulses are not fed to the image reproducing tube before they are suppressed.

Figure 3:
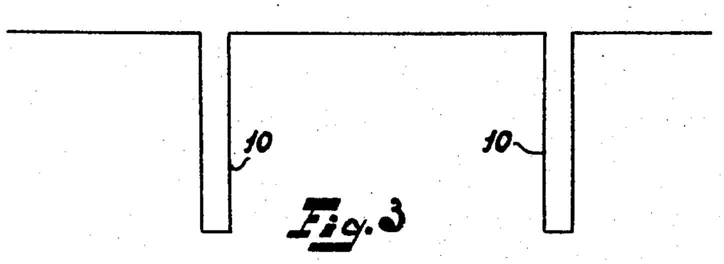
Figure 5:
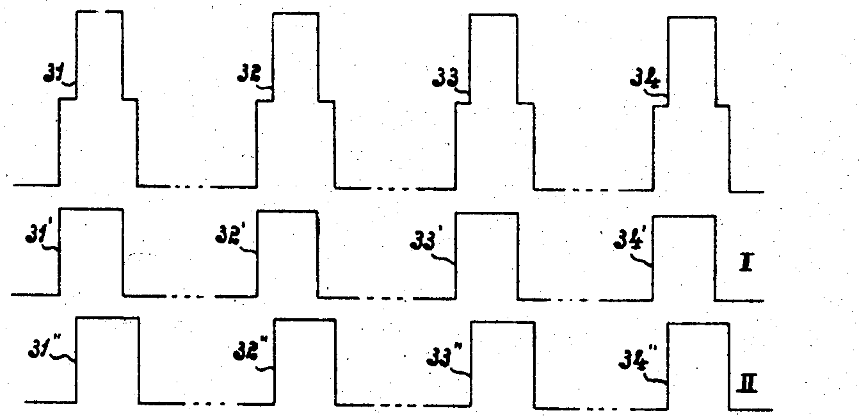
Fig. 5 shows the production of the blanking signals of the reproducing tube.

(*c*) The superimposition of two series of pulses equal to the pulses shown in Fig. 3, having a repetition frequency of the line synchronizing pulses, one of the series being slightly displaced relatively to the other by means of the delay line, so that a signal having two porches is obtained and supplied to the receiver for the reception of the "internal" program or the "internal" colour component. These signals are shown in Fig. 5. The square-wave signals 31', 32', 33' and so on of the series 1 are obtained subsequent to the separation of the line synchronizing signals 10 of Fig. 2 by the said means, whereas the signals 31'', 32'', 33'' and so on of the series 2 are obtained by delaying the corresponding signals of series 1; their superimposition produces the signals having two porches 31, 32, 33 and so on. By means of suitable smoothing devices or other equivalent devices, the amplitude of the back porch is fixed so that it can reach the black level of the internal modulation, whereas the amplitude of the front porch extends beyond this level and is capable of producing, by suitable means, pulses having an amplitude equal to or substantially equal to K.

The said signals shown in Fig. 5 produces the suppression of the line synchronisation of the internal program or of the internal component of the colour images with positive modulation of the main carrier (Fig. 2). With negative modulation (Fig. 4) the problems are the same and are solved in the same manner. Only the amplitudes and polarities of the signals shown in Fig. 5 are reversed by known means. In this case the suppression of these signals takes place in the external program or the external colour component.

The suppression of one of the programs must, of course, also be carried out during the frame synchronizing pulses. According to the invention this is obtained in the same manner and by the same method as with the line synchronizing pulses. Only the time constants of definite known circuit elements producing the signals are changed.

Figure 6:
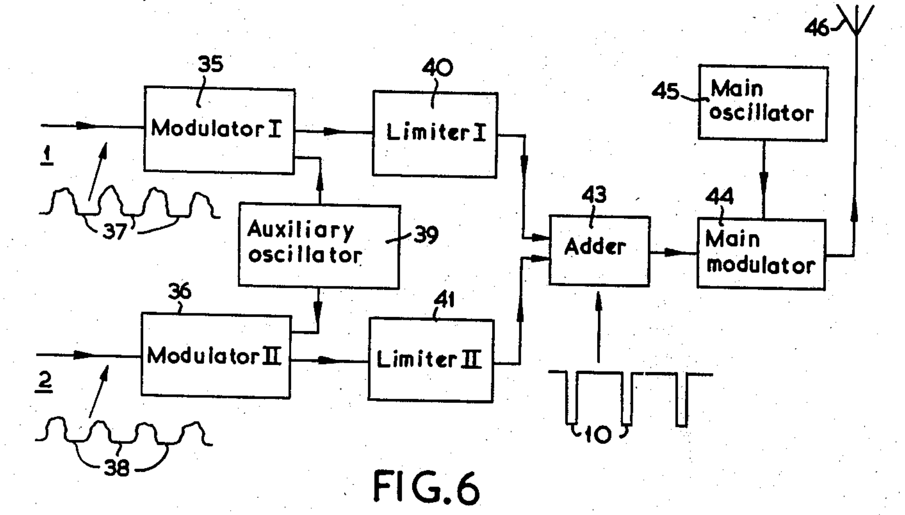
Fig. 6 is a block diagram of a transmitter in accordance with the invention.

The transmitter of Fig. 6 produces the signals described above. A first modulator 35 and a second modulator 36 are connected to receive the signals 1 and 2, respectively, and are connected to an auxiliary oscillator 39. The outputs of the modulators are connected, through first and second limiters 40 and 41, respectively, to an adder circuit 43, the output of which is connected to a main modulator 44. A main oscillator 45 is connected to the main modulator 44, and the output of this modulator is connected to an antenna 46.

Signal 1, with black level 37, is fed to the modulator I, in which modulator the signal 1 is modulated on the auxiliary carrier wave 4 which is delivered by the auxiliary oscillator 39. The signal 2, with black level 38, is modulated in the same manner on the auxiliary carrier wave 4 in the modulator II. The modulated signals are supplied respectively to the limiters I and II, in which limiters one-half of each of the auxiliary carrier waves is cut-off. That is to say, in limiter I the negative part and in limiter II the positive part is cut-off. The two resulting signals are added together in the adder 43, to which adder are also supplied the synchronizing pulses 10. The output signal of adder 43 is that shown in Fig. 2 when the pulses 10 have a negative polarity and that shown in Fig. 4 when the pulses 10 have a positive polarity. The line 3 in these Figures represents the axis of the auxiliary carrier wave, and it should be noted that for the output signal of adder 43 this axis coincides with a voltage level of zero volts.

This output signal is modulated on the main carrier wave, which is delivered by the main oscillator 45, in the main modulator 44. The output signal of this modulator is transmitted by means of the aerial 46.

Figure 7:
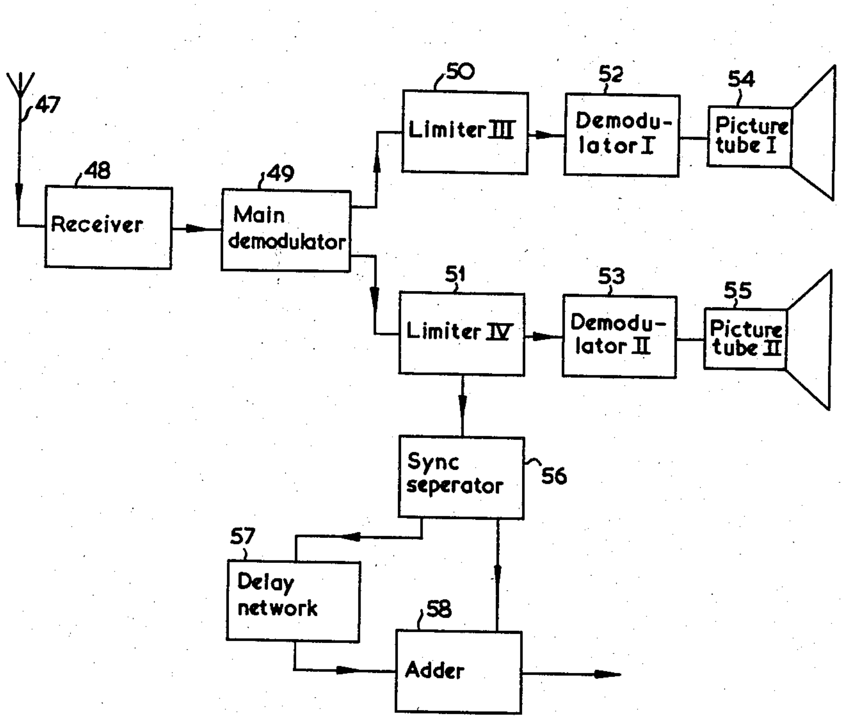
Fig. 7 is a block diagram of a receiver in accordance with the invention.

The receiver of Fig. 7, for receiving the signals produced by the transmitter of Fig. 6, comprises an antenna 47 connected to conventional receiver circuits 48, the output of which is connected to a main demodulator 49. First and second demodulators 52 and 53 are connected, through third and fourth limiters 50 and 51, to the output of the main demodulator 49. First and second picture tubes 54 and 55 are connected, respectively to the outputs of the demodulators 52 and 53. A synchronizing signal separator 56 is connected to the signal channel containing the first demodulator or to the signal channel containing the second demodulator, and is shown connected to the limiter 51 in the channel containing the second demodulator 53. An adder circuit 58 is connected to the output of the synchronizing separator 56, and a delay network 57 is connected between the synchronizing separator 56 and the adder 58.

The main demodulator 49 removes the main carrier wave, and the output signal thereof is similar to the output signal of the adder 43 in the transmitter.

In the limiter III only the upper half, and in limiter IV only the lower half, of the signal is passed.

In demodulators I and II the auxiliary carrier waves are removed and the signals thus obtained are fed to the picture tubes I and II.

If the output signal of the main demodulator 49 has the form as shown in Fig. 2, the lower half of the signal comprises the synchronizing pulses which are separated in the synchronizing separator and used for the synchronization of the defection circuits. In this case the synchronizing separator 56 is connected to the signal channel containing demodulator II. If the output signal of the main demodulator 49 has the form as shown in Fig. 4, the upper half of the signal comprises the synchronizing signals. In that case the synchronizing separator 56 has to be connected to the signal channel containing demodulator I. The synchronizing pulses are also used to form the signals 31, 32, 33 and so on, shown in Fig. 5. To this end, the output signals of the synchronizing separator 56, i. e. the square-wave signals 31′, 32′, 33′ and so on, are directly applied to the adder 58. These signals are also applied to the delay network 57 to obtain the delayed square-wave signals 31″, 32″, 33″ and so on. In the adder 58 the series I and II are combined to obtain the desired signal.

The limiters I, II, III and IV can comprise discharge tubes. When the upper half of the signal has to be transmitted the total signal is fed to a control grid of the tube and the tube is biased in such a manner that the axis 3 coincides with the cut-off voltage level of the tube. When the lower half of the signal has to be transmitted it is also applied to a control grid but the tube is now biased in such a manner that the axis 3 coincides with the voltage level at which the saturation current will flow.

What is claimed is:

1. A system for the simultaneous transmission of two television signals each having a periodically occurring black reference level, comprising a source of an alternating auxiliary carrier wave, means for amplitude modulating the positive-polarity half-cycle periods of said auxiliary carrier wave in accordance with one of said signals, means for amplitude modulating the negative-polarity half-cycle periods of said auxiliary carrier wave in accordance with the other one of said signals, a source of a main carrier wave having a frequency higher than the frequency of said auxiliary carrier wave, means for modulating said main carrier wave in accordance with said modulated auxiliary carrier wave whereby one of said signals is modulated on the external sides of the axes of the auxiliary carrier wave with respect to the axis of the main carrier wave and the signal other than the last-mentioned signal is modulated on the internal sides of the axes of the auxiliary carrier wave with respect to the axis of the main carrier wave, and means connected to fix the values of said black reference levels at magnitudes such that they substantially coincide in said modulated main carrier wave.

2. A system as claimed in claim 1, in which one of said television signals corresponds to a green color component and the other of said television signals corresponds to a red color component, and means for polarizing said modulated auxiliary carrier wave relative to said main carrier wave so that said green color component signal is said signal which is modulated on the external sides of the auxiliary carrier wave axes and said red color component signal is said signal which is modulated on the internal sides of the auxiliary carrier wave axes.

3. A system as claimed in claim 2 including means to fix the modulation range of said green color component signal of approximately 50% and that of said red color component signal at approximately 30%, respectively, of the total amplitude range of modulation of said auxiliary carrier.

4. A system as claimed in claim 1, in which each of said signals comprises synchronizing pulses which occur simultaneously, and including means connected to suppress said main carrier wave when said synchronizing pulses occur.

5. A system as claimed in claim 1, in which said signals comprise synchronizing pulses, and including a receiver for receiving said modulated main carrier and comprising an image reproducing tube for producing an image in accordance with said signals, and means for suppressing said image during the occurrence of said synchronizing pulses.

References Cited in the file of this patent

UNITED STATES PATENTS

| | | |
|---|---|---|
| 2,352,634 | Hull | July 4, 1944 |
| 2,607,035 | Levine | Aug. 12, 1952 |
| 2,696,523 | Theile | Dec. 7, 1954 |
| 2,666,806 | Kalfaian | Jan. 19, 1954 |